United States Patent [19]
Clark

[11] Patent Number: 5,412,177
[45] Date of Patent: May 2, 1995

[54] REMOVABLE HEATED COVER FOR A WINDSHIELD WIPER BLADE ASSEMBLY

[76] Inventor: Russell W. Clark, 139th Rainbow, Belton, Mo. 64012

[21] Appl. No.: 163,886

[22] Filed: Dec. 8, 1993

[51] Int. Cl.⁶ .............................................. H05B 3/84
[52] U.S. Cl. .................................. 219/203; 15/250.07
[58] Field of Search ............................... 219/202, 203; 15/250.05, 250.07

[56] References Cited

U.S. PATENT DOCUMENTS

| | | | |
|---|---|---|---|
| 2,255,393 | 9/1941 | Osborn | 219/203 |
| 2,469,791 | 5/1949 | Schneider | 15/250.07 |
| 2,790,194 | 4/1957 | Norine | 15/250.05 |
| 3,523,626 | 8/1970 | Racine | 15/250.07 |
| 3,619,556 | 11/1971 | Deibel | 219/203 |
| 3,936,901 | 2/1976 | Theckston | 15/250.04 |
| 4,325,160 | 4/1982 | Burgess | 15/250.06 |
| 4,360,941 | 11/1982 | Mabie | 15/250.07 |
| 4,387,290 | 6/1983 | Yasuda | 219/202 |
| 4,497,083 | 2/1985 | Nielsen, Jr. et al. | 15/250.06 |
| 4,603,451 | 8/1986 | Van Sickle | 15/250.07 |
| 4,670,933 | 6/1987 | Toplenszky | 15/250.07 |
| 4,700,424 | 10/1989 | Hagen | 15/250.04 |
| 4,852,204 | 11/1989 | Wilson | 15/250.07 |
| 4,928,344 | 5/1990 | Bliss | 15/250.06 |
| 4,928,345 | 5/1990 | Meltzer et al. | 15/250.06 |
| 4,967,437 | 11/1990 | Morse | 15/250.07 |

FOREIGN PATENT DOCUMENTS

| | | | |
|---|---|---|---|
| 962813 | 2/1975 | Canada | 15/250.42 |
| 820156 | 7/1937 | France | 15/250.06 |
| 1025776 | 1/1953 | France | 15/250.07 |
| 137452 | 3/1959 | Sweden | 15/250.07 |
| 183360 | 3/1936 | Switzerland | 15/250.07 |

OTHER PUBLICATIONS

Foregn Pat: 301093 Sep. 26, 1932 Italy–Costamagna.

*Primary Examiner*—Teresa J. Walberg
*Attorney, Agent, or Firm*—Kenneth W. Iles

[57] ABSTRACT

An electrically heated cover for wiper blade assemblies includes a cover body having front, rear, right-hand and left-hand end walls and a top wall having a longitudinal access opening for allowing ready connection of the wiper blade assembly to a wiper arm. Electrical resistance heating elements are attached to the inner surface of the cover body and are electrically connected to the vehicle electrical system to provide heat that prevents formation of ice on the wiper blade assembly, the wiper blades and the windshield during severely cold snowy weather. The cover is held in place by a plurality of thumb or set screws through the cover that bear against the wiper blade assembly and are kept from slipping by rubber bushings that contact the wiper blade assembly. The cover can be easily removed and installed and allows completely normal operation of the windshield wipers, and requires no alteration of pre-existing equipment.

9 Claims, 3 Drawing Sheets

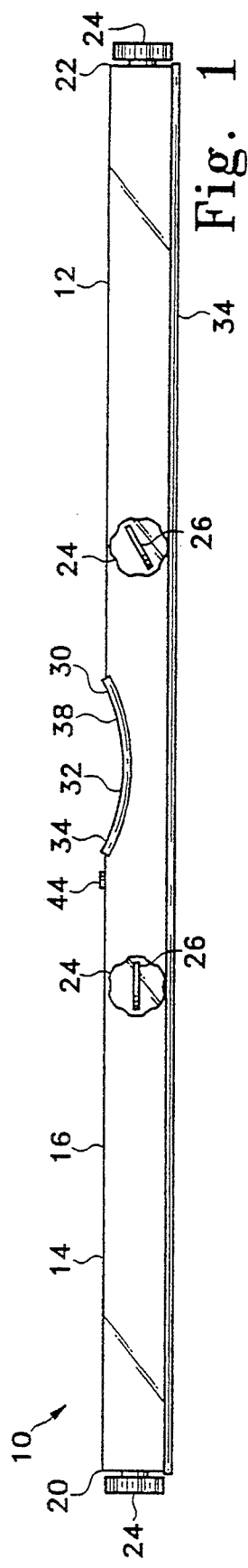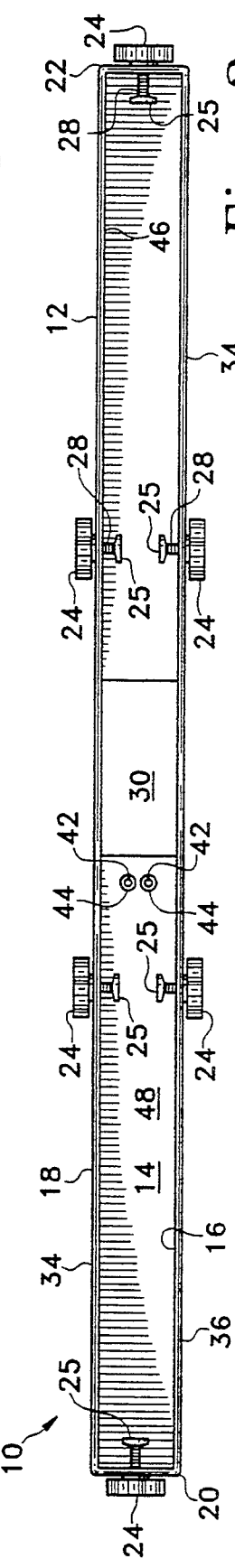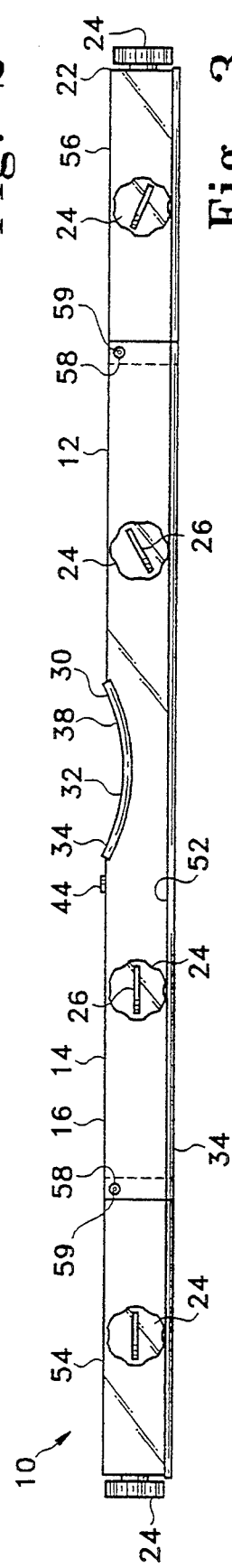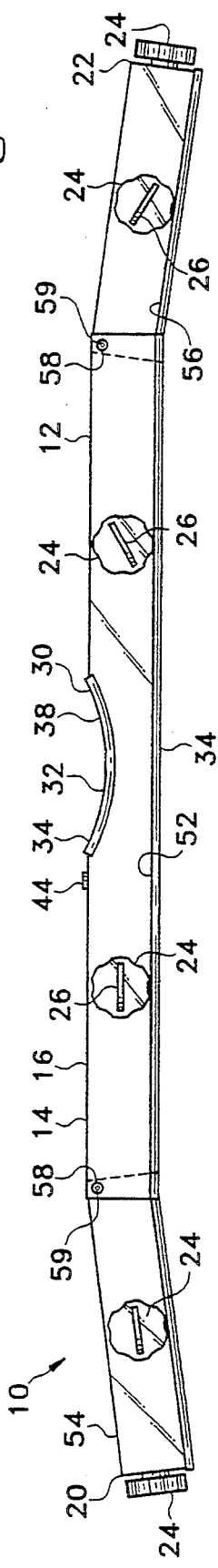

REMOVABLE HEATED COVER FOR A WINDSHIELD WIPER BLADE ASSEMBLY

BACKGROUND OF THE INVENTION

1. Field of the Invention

The present invention is related to an apparatus for preventing ice from forming on vehicle windshield wiper blades and wiper blade assemblies even during very cold weather. More particularly, the present invention is directed to an electrically heated housing or cover that is easy to install or remove from a windshield wiper and wiper blade assembly that prevents formation of ice on the wiper blade and wiper blade assembly during snow storms, ice storms, freezing rain storms and the like.

2. Description of Related Art Including Information Disclosed Under 37 C.F.R. Sections 1.97–1.99

In very cold weather, it may be difficult or impossible to prevent build-up of ice on vehicle windshield wiper blades, wiper blade assemblies and the windshield, even with the vehicle engine fully heated and properly operating defrosters working as effectively as possible. The build-up of ice on the windshield, wiper blades and the wiper blade assemblies is naturally a grave safety hazard, requiring drivers to stop periodically along the road, sometimes as often as every 10-15 minutes, to scrap the ice from the wiper blade assemblies and the windshield. This procedure itself is very hazardous because it is frequently not possible to leave the road entirely and visibility of all drivers is usually very limited during weather conditions that lead to formation of heavy ice on the windshield.

Truck drivers, who must drive through mountains and in all weather, perhaps face this problem most starkly. Truck drivers experience the greatest difficulty in finding a safe place to stop their trucks to clear the windshield and wiper blade assemblies of ice. Trucks must allow greater distances for stopping, especially during inclement weather and for maneuvering, so reduced visibility places them in even greater danger than passenger cars and busses.

In the past many efforts to address and solve this problem by directly heating the wiper blade or its immediate environment outside the vehicle (as opposed to an interior defroster or electrically heated windshield with resistance elements such as wired embedded therein) have been made, and some have led to issued patents. Most of these solutions involve efforts to heat the wiper blade itself, typically by running an electrical heating element though the rubber or rubber-like wiper blade. These types of solutions have not become widely adopted because they share numerous problems. For example, the flexible edge of typical windshield wiper blades are too narrow to allow the passage of all but the smallest heating element, one which could not carry enough heat to keep the wipers and windshield free from ice. A small heating element in the wiper blade itself, moreover, will not prevent the formation of ice on the wiper blade assembly, which permits the wiper blade assembly to flex and bend, as it must in order to allow the wiper blade to follow the curvature found on most windshields and to press the wiper blade firmly against the windshield. This causes the wiper blades to skate across the windshield, with significant portions of the blades not in contact with the windshield. Placing a heating element wire through the wiper blade causes the blade to lose some of its flexibility, which is vital to its function because the edge of the blade bends to change its angle of attack relative to the windshield every time the wiper blade assembly changes direction of motion. Heat and ozone are probably the two factors that cause the most severe damage to wiper blades, which typically loose their effectiveness after only a few months at most under good conditions. Heating them significantly and deliberately causes failure much faster. Further, it is relatively expensive to provide a heating element through a wiper blade. The wiper blades would be on the vehicle all the time, but their ice prevention capability would rarely be needed. These expensive blades either would be used as ordinary blades for the overwhelming proportion of their lives, or the vehicle operator would install them only when needed. But when the apparent need for them becomes evident, the weather will likely make their installation either very difficult or impossible. For these and other reasons, electrically heated wiper blades themselves, i.e., having a heating element embedded in the wiper blade, are not adequate solutions to the problem.

Another approach to solving this problem was to provide a wiper blade assembly including a single rod of electrically resistive metal along the assembly in a single unitary unit that cannot be repaired. Such assemblies have are very expensive to make compared with wiper blades and have no provision for changing the wiper blades, requiring wasteful disposal of the entire unit whenever the wiper blade wears out. Further, such units are too heavy for the power of most windshield wiper motors, causing them to burn out prematurely.

Therefore, it is clear that there is a need for a removable heated cover for vehicle windshield wiper blades that can be readily installed and removed; that does not require any change in the wiper blade or wiper blade assembly; that does not distort or otherwise alter the normal action of the wiper blade; that is light weight, thereby not overtaxing wiper motors; that prevents formation of ice on wiper blades, wiper blade assemblies and the windshield; and that is inexpensive to manufacture; and that can be readily stored with other emergency supplies such as flares, triangular reflectors, jumper cables and the like, for use during heavy icing conditions.

SUMMARY OF THE INVENTION

Accordingly, it is a primary object of the present invention to provide a removable heated cover for a vehicle windshield wiper blade assembly that can be readily installed and removed.

It is a another object of the present invention to provide a removable heated cover for a vehicle windshield wiper assembly that does not require any change in the wiper blade or wiper blade assembly.

It is a another object of the present invention to provide a removable heated cover for a vehicle windshield wiper blade assembly that does not distort or otherwise alter the normal action of the wiper blade.

It is a another object of the present invention to provide a removable heated cover for a vehicle windshield wiper blade assembly that is light weight, thereby not overtaxing wiper motors.

It is a another object of the present invention to provide a removable heated cover for a vehicle windshield wiper blade assembly that prevents formation of ice on wiper blades, wiper blade assemblies and the windshield.

It is a another object of the present invention to provide a removable heated cover for a vehicle windshield wiper blade assembly that is inexpensive to manufacture.

It is a another object of the present invention to provide a removable heated cover for a vehicle windshield wiper blade assembly that can be readily stored with other emergency supplies such as flares, triangular reflectors, jumper cables and the like, for use during heavy icing conditions.

These and other objects of the present invention are achieved by providing a cover in the form of a cover body having a substantially enclosed top wall, a front wall, a rear wall, a left side end wall and a right-hand end wall that fits over a wiper blade assembly and is fixed to it by a plurality of threaded thumb screws (preferably one in each end wall, and two each on the front wall and rear wall) received threaded apertures in the respective cover body wall and that are tightened to engage the wiper blade assembly to hold the cover securely in place, while allowing unencumbered freedom of prescribed movement to the wiper blade assembly and wiper blade itself. The cover body has no bottom wall, with the wiper blade extending outwardly of the lower edge of the cover body walls, allowing normal contact of the wiper blade with the windshield.

The inside surface of the cover body is covered with adhesively secured electrical resistance wiring that becomes warm when an electrical current is passed through it. The electrical resistance wiring is similar to the type of heating element commonly known as "heat tape." Electrical leads connect the heat tape to the electrical system of the vehicle, via the cigar lighter in a preferred embodiment. The heating element is designed to operate from the battery voltage of the vehicle.

In an alternative embodiment, the cover body is formed from a plurality of separate sections, preferably three sections, with an end section attached to the center section by rivets or other fasteners that allows pivotal movement of the joined sections relative to one another. This embodiment allows the cover body to conform to and accommodate wiper blade assemblies used with sharply curved windshields.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE DRAWING

FIG. 1 is a side elevation of a removable electrically heated cover for a wiper blade assembly and wiper blade according to the present invention.

FIG. 2 is a bottom plan view the wiper blade assembly cover of FIG. 1 showing the electrical heating element.

FIG. 3 is a side elevation of an alternative embodiment of the heated cover of FIG. 1, having hinged cover body sections to accommodate wiper blade assemblies for sharply curved windshields.

FIG. 4 is a side elevation of the heated cover of FIG. 3 showing the hinged sections in a bent position.

DETAILED DESCRIPTION OF THE PREFERRED EMBODIMENTS

Figure 5:
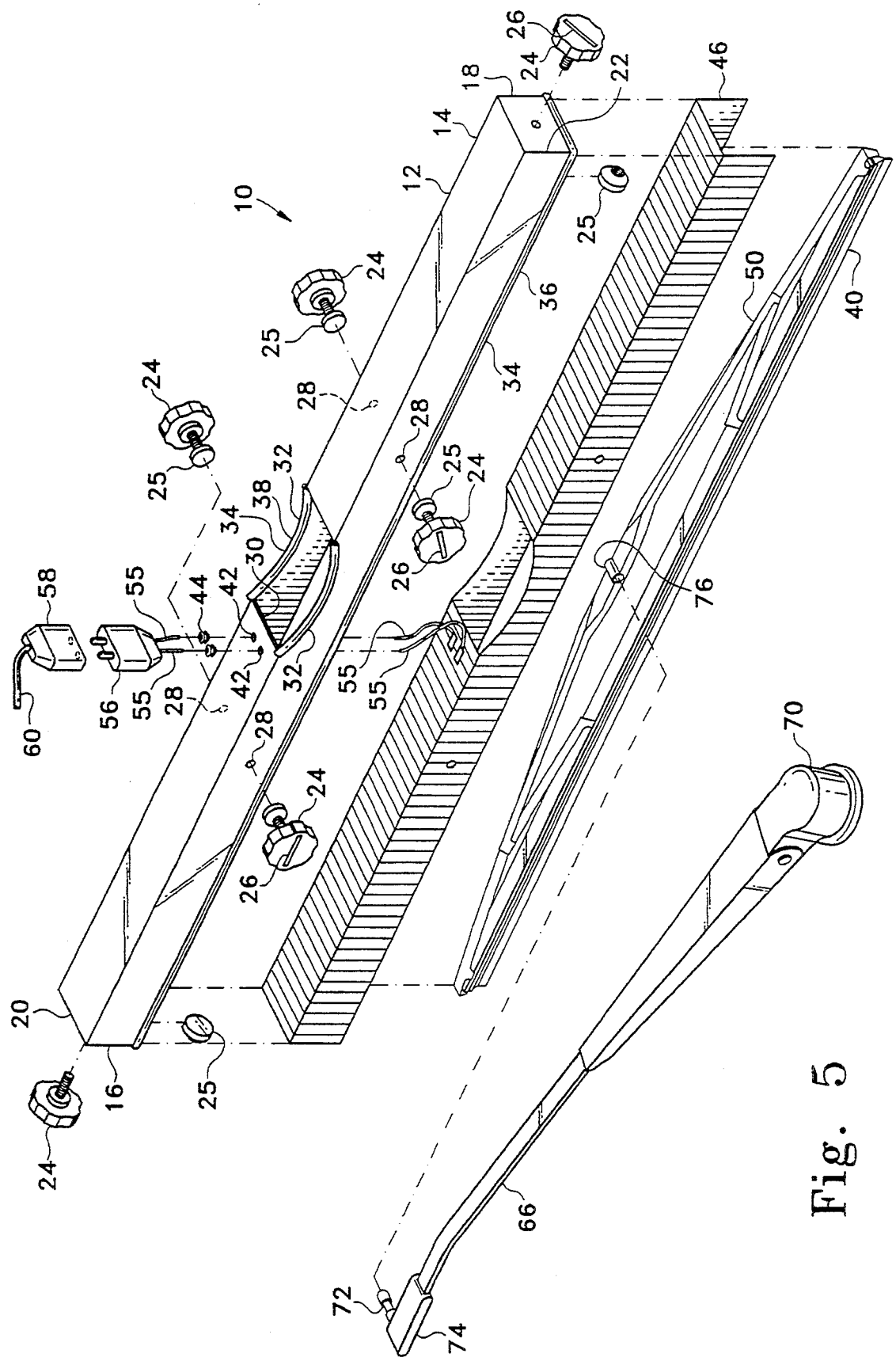
FIG. 5 is left-hand exploded perspective view of the heated wiper blade assembly cover FIG. 1 showing how the elements of the invention fit together, and how the heated cover is installed on a wiper blade assembly.

As required by the Patent Statutes and the case law, the preferred embodiments of the present invention and the best mode currently known to the inventor for carrying out the invention are disclosed in detail herein. The embodiments disclosed herein, however, are merely illustrative of the invention, which may be embodied in various forms. Therefore, specific structural and functional details disclosed herein are not to be interpreted as limiting, but merely to provide the proper basis for the claims and as a representative basis for teaching one skilled in the art to which the invention pertains to make and use the apparatus disclosed herein as embodied in any appropriately specific and detailed structure.

FIG. 1 shows a side elevation of a removable electrically heated cover 10 for a wiper blade assembly 50 and wiper blade 40 according to the present invention, comprising a cover body 12 having a top wall 14, a front wall 16, a rear wall 18, a left-hand end wall 20 and a right-hand end wall 22. A plurality of threaded thumb screws 24, each having a slot 26 for accepting a screwdriver blade, are located in the respective side and end walls of the cover 10 and are each received in a respective threaded aperture 28 through the cover 10. In the preferred embodiment of FIGS. 1, 2, 5 and 6, two thumb screws 24 are located along the front wall 16 and the rear wall 18, at intervals to divide the length of these walls roughly into thirds and one thumb screw 24 is located in each of the end walls 20, 22, roughly in the center of each end wall 20, 22. Small rubber bushing members 25 are attached to the threaded end of each thumb or set screw 24 to prevent the screws 24 from "walking" along the wiper blade assembly 50 (FIGS. 5, 6) members during installtion and from slipping during use.

A longitudinal installation opening 30 is formed in the top wall 14 along the middle of its length and includes an aligned upwardly concave open area 32 in both the front wall 16 and the rear wall 18. The installation opening 30 allows for easy installation and removal of the cover 10, as described below. A rubber molding strip 34 is fixed along a bottom edge perimeter 36 of the cover 10, and along the upwardly concave edges 28 of the installation opening 30. The rubber molding strips 34 include a split, which is pressed along the respective edges and are held in place by frictional engagement. An adhesive may also be used. The rubber molding strips 34 do not touch the windshield or extend outwardly from the cover body 12 as far as the wiper blade 40 (see FIGS. 5, 6). Their purpose is to guard the user against cuts that may result from sharp edges when the cover body 12 is made of sheet metal and to provide a fininshed appearance.

FIG. 2 shows a bottom plan view the wiper blade assembly cover 10 of FIG. 1 showing a pair of adjacent electrical lead openings 42, each having a grommet 44 seated therein and a portion of an electrical heating element 46. The electrical heating element 46 is in the form of a heat tape-like product that includes an electrical heating resistance wire embedded in an insulating medium that keeps the electrical resistance wire from shorting out against itself and which includes an adhesive backing for permanently fastening or bonding the electrical heating element or electrical heat tape element 46 to an inner or interior surface 48 of the cover body 12. Alternatively, the electrical heating element 46 can be bonded with a separately applied adhesive. As shown best in FIG. 5, the electrical resistance heating element 46 is formed to conform with the shape and size of the interior surface 48 of the cover body 12, including all apertures and other openings before it is placed inside the cover body 12.

FIG. 3 is a side elevation of an alternative embodiment of the heated cover assembly of FIG. 1, having three distinct and separate hinged cover body sections to accommodate wiper blade assemblies 50 for sharply curved windshields. A central cover body section 52 is pivotally connected to a left-hand cover body section 54 by a rivet 58 through aligned apertures 59 in each of the front wall 16 and rear wall 18 of both cover body sections 52, 54. A right-hand cover body section 56 is similarly attached to the right-hand end of the central cover body section 52. There is some overlap of the respective attached sections, which limits the degree of deflection permitted and provides additional strength at the rivets 58. As shown in FIG. 4, the left-hand cover body section 54 and the right-hand cover body section 56 pivot about their connections to the central cover body section 52, thereby allowing the cover 10 to accommodate windshield wiper blade assemblies 50 used on sharply curved windshields. In the embodiment of FIGS. 2, 3, one additional thumb or set screw 24 is located in each of the front wall 16 and rear wall 18 of the left-hand cover body section 54 and of the right-hand cover body section 56 to keep the cover on the curved wiper blade assembly 50 and to keep the wiper blade assembly 50 covered, thereby insuring that the heat generated by the electrical heating element 46 is directed toward the general area of the wiper blade assembly 50, the wiper blade 40, and a windshield 53.

Referring now to FIG. 5, there is shown a left-hand exploded perspective view of the heated wiper blade assembly cover FIG. 1 showing how the elements of the invention fit together, and how the heated cover is installed on a wiper blade assembly. A pair of electrical leads 55 is mechanically and electrically connected to the electrical resistance heating element 46 and threaded through the grommets 44 and into a male electrical plug 56, which detachably mates with a matching female plug member 58, which is connected to a two pair electrical lead set or cable 60 of 6–10 feet at a proximal end 63 and which terminates at a distal end 61 in a male single prong plug 62 for inserting in the cigar lighter socket 64 (FIG. 6) inside the vehicle. The cigar lighter socket 64 presents a readily accessible place for connecting the cover 10 to the vehicle electrical system and the connecting circuit is typically wired and fused for 20 amps, which is more than adequate for the task performed by the cover 10.

Still referring to FIG. 5, installation and removal of the cover 10 from the wiper blade assembly is most easily seen. A wiper arm 66 is connected to the transmission shaft 68 (FIG. 6) of the wiper motor near the base of the windshield 53 at the connecting hub 70 of the wiper arm 66. Customarily, to connect the wiper blade assembly 50 to the wiper arm 66, a substantially cylindrical connecting pin 72 on the distal end 74 of the wiper arm 66 is inserted in to a receiving sleeve 76 formed in the top center portion of the wiper blade assembly 50, where it snaps into place. A release button is pushed inwardly to allow removal of the wiper blade assembly 50 from the wiper arm. To install the cover 10, the user simply removes each wiper arm assembly 50 from the wiper arm 66 in the usual fashion. Then the cover 10 is installed on the wiper arm assembly 50 by aligning the cover properly and tightening the set screws 24. The wiper blade assembly 50 with the cover 10 attached is then attached to the wiper arm 66 in the usual fashion, with the distal end 74 of the wiper arm 66 being fitted into the installation opening 30 in the top wall 14 of the cover body 12. To remove the cover 10 from the wiper blade assembly 50, these steps are reversed and the wiper blade assembly 50 is reinstalled on the wiper arm 66 without the cover 10 in place. In using the alternative sectioned embodiment of FIGS. 3, 4, the additional step of pivoting the left-hand and right-hand cover body sections 54, 56 relative to the central cover body section 52 to align the entire cover 10 with the wiper blade assembly being used. Thus, the cover 10 can be readily installed and removed from a wiper blade assembly 10.

Figure 6:
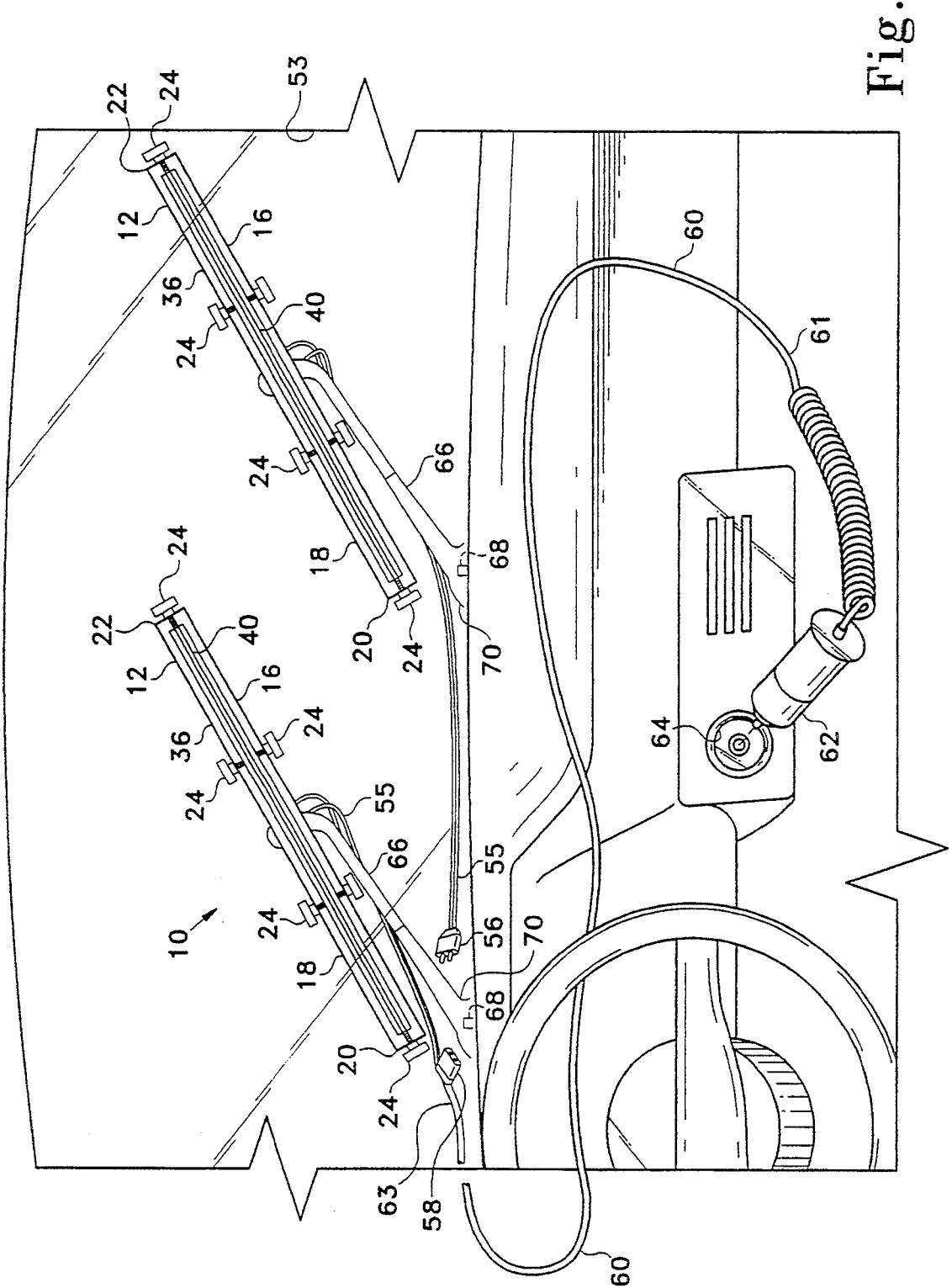
FIG. 6 is an environmental view of the present invention in use on the windshield of a motor vehicle shown from inside the vehicle.

FIG. 6 is an environmental view of the present invention in use on the windshield of a motor vehicle shown from inside the vehicle.

In all embodiments discussed herein, the cover body 12 is preferably made of light gauge sheet metal. Changes in specific elements of the embodiment disclosed herein, however, may occur to those of superior skill in the art. For example, molded fiberglass or plastic resins that do not significantly deteriorate when exposed to heat can be used to form the cover body 12.

"Further, the interior or exterior surfaces of the cover body 12 can be covered or coated with a heat insulating material to retard the escape of heat through the walls of the cover body 12. The electrical resistance heating element 46 can be replaced with a coating that amorphously conducts electricity and thereby generates heat. The set screws 24 may be replace with other fasteners, such as loop and hook fasteners, with one part of this combination fastener attached by adhesive to the wiper blade assembly 50 at suitable locations and the other element of the fastening system attached to the cover body 12 at matching locations by a suitable adhesive. The electrical leads 55 may be hardwired into the vehicle's wiring system, with the plug tucked neatly beneath the hood when not in use, much as lighting wires for trailers are currently connected, or as most electrical rear window defrosters in vehicles. Naturally, the cover 10 can be manufactured in various sizes and heating ranges to provide a suitably wide selection of electrically heated wiper blade assembly covers, as required to serve different vehicle needs. Other changes may also be developed within the scope and spirit of the present invention.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

I claim:

1. A removable heated cover for a vehicle windshield wiper blade assembly comprising:

a. a cover body having a top wall, a front wall, a rear wall, and two end walls forming a space enclosed on five sides and having an open bottom;

b. a longitudinal installation opening in said top wall;

c. an electrical resistance heating element fixed to an inner surface of said cover body and including means for connecting said electrical resistance heating element to an electrical system of a vehicle; and d. means for attaching said cover body to a wiper blade assembly.

2. A removable heated cover for a vehicle windshield wiper blade assembly according to claim 1 further comprising a rubber molding along a bottom edge of said cover body.

3. A removable heated cover for a vehicle windshield wiper blade assembly according to claim 1 wherein said electrical connecting means further comprises a two wire electrical cable mechanically and electrically connected to said electrical resistance heating element at a proximal end and terminating in a male single prong plug at a distal end, with said male single prong plug adapted to fit into a cigar lighter socket in said vehicle.

4. A removable heated cover for a vehicle windshield wiper blade assembly according to claim 3 wherein said electrical resistance heating element further comprises an electrical heat tape element bonded to said interior surface of said cover body by an adhesive.

5. A removable heated cover for a vehicle windshield wiper blade assembly according to claim 1 wherein said cover body further comprises a central cover body section having a left-hand end and a right-hand end, a left-hand cover body section pivotally attached to said central body section adjacent to said left-hand end of said central body section, and a right-hand cover body section pivotally attached to said central cover body section adjacent to said right-hand end of said central cover body section wherein said left-hand cover body section overlaps said left-hand end of said central body section and is pivotally joined thereto by a fastener, and said right-hand cover body section overlaps said right-hand end of said central cover body section and is pivotally joined thereto by a fastener.

6. A removable heated cover for a vehicle windshield wiper blade assembly comprising:

a. a cover body having a top wall, a front wall, a rear wall, and two end walls forming a space enclosed on five sides and having an open bottom;

b. a longitudinal installation opening in said top wall;

c. an electrical resistance heating element fixed to an inner surface of said cover body and including means for connecting said electrical resistance heating element to an electrical system of a vehicle; and d. means for attaching said cover body to a wiper blade assembly, said attachment means further comprising a plurality of set screws, each said set screw threaded through a threaded aperture in said cover body for engaging a wiper blade assembly.

7. A removable heated cover for a vehicle windshield wiper blade assembly according to claim 6 wherein said electrical connecting means further comprises a two wire electrical cable mechanically and electrically connected to said electrical resistance heating element at a proximal end and terminating in a male single prong plug at a distal end, with said male single prong plug adapted to fit into a cigar lighter socket in said vehicle.

8. A removable heated cover for a vehicle windshield wiper blade assembly according to claim 6 wherein said cover body further comprises a central cover body section having a left-hand end and a right-hand end, a left-hand cover body section pivotally attached to said central body section adjacent to said left-hand end of said central body section, and a right-hand cover body section pivotally attached to said central cover body section adjacent to said right-hand end of said central cover body section.

9. A removable heated cover for a vehicle windshield wiper blade assembly according to claim 6 wherein said means for attaching said cover body to a wiper blade assembly further comprises a rubber bushing seated on an end of each said set screw that is inside an interior space defined by said cover body.

* * * * *